Oct. 20, 1925.  
H. E. HAGGENMACHER  
METHOD OF PRODUCING CATALYTIC REACTIONS  
Filed April 13, 1921  
1,557,687
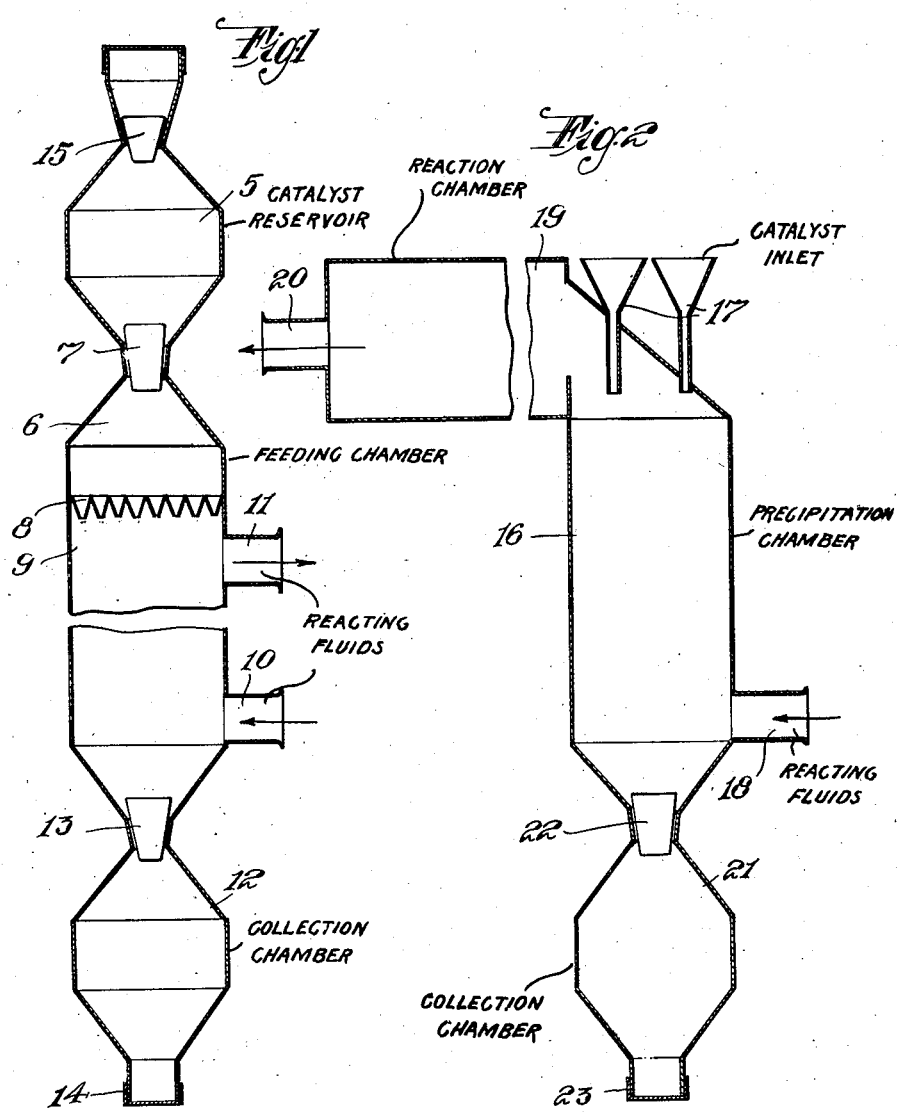
INVENTOR  
H. E. Haggenmacher,  
BY C. P. Goepel  
ATTORNEY Patented Oct. 20, 1925.

1,557,687

UNITED STATES PATENT OFFICE.

HANS E. HAGGENMACHER, OF NEW YORK, N. Y.

METHOD OF PRODUCING CATALYTIC REACTIONS.

Application filed April 13, 1921. Serial No. 460,990.

*To all whom it may concern:*

Be it known that I, HANS E. HAGGENMACHER, a citizen of the Republic of Switzerland, and resident of the borough of Manhattan, city, county, and State of New York, have invented certain new and useful Improvements in Methods of Producing Catalytic Reactions, of which the following is a specification.

This invention relates to an improved method of producing catalytic reactions between gases, vapors, gases and vapors or other fluids.

It is one of the primary objects of my present invention to provide a method of this character of such a nature that it will result in the elimination of accumulation of poisoned catalytic agent in the reaction chamber and will produce a constant or unvarying percentage of the desired end product.

My invention also contemplates a method wherein an unactivated catalytic agent is uniformly distributed in the reaction chamber to thereby produce a maximum yield of the end product for a predetermined temperature, pressure and rate of flow of the reacting fluid.

I also aim to provide a method of producing catalytic chemical reactions whereby the reaction may be continuously carried on, and it is unnecessary to periodically interrupt the process to replace the poisoned catalytic agent by a regenerated catalytic agent and wherein the catalytic agent is employed in such form that its regeneration may be more readily accomplished.

More particularly, by means of the present invention I propose to dispense altogether with the use of a support for the catalytic agent which has heretofore been commonly employed in such reaction processes and which, as is well known, results in a more or less uncertain contact of the gases with the catalytic agent and the production of undesirable by-products, such support being likewise difficult of preparation and seriously interfering with rapid and thorough regeneration of the catalytic agent.

With the above and other objects in view, the invention consists in the improved method and in the several steps thereof as will be hereinafter more fully described and subsequently incorporated in the subjoined claims.

In the accompanying drawing I have illustrated more or less diagrammatically, several typical types of apparatus which may be successfully employed in carrying out the present invention. In this drawing, wherein similar reference characters designate corresponding parts in the several views, Figure 1 is a vertical sectional view through one type of apparatus particularly designed for use in connection with a powdered or comminuted catalytic agent;

Figure 2 is a similar view showing another type of apparatus which is employed when the catalytic agent is supplied to the reaction chamber in colloidal suspension with a fluid or liquid.

It is the present practice in the art to which this invention relates to use a fixed catalyzer which generally consists of a suitable more or less homogeneous material constituting the support and capable of resisting disintegration by temperature, pressure or chemical reactions occurring in the reaction chamber. This support is covered or impregnated with a catalytic agent, such for instance as nickel, copper, aluminum or tungsten oxides or any of the other well known catalytic agents which are necessary in order to produce the desired chemical reaction.

This fixed catalyzer is introduced into the reaction chamber and under suitable conditions of temperature and pressure the reacting gases are brought into intimate contact with the catalytic agent during their flow through the reaction chamber. The activation of the catalyzer gradually decreases until finally, as is commonly said, it "becomes poisoned." It is then necessary to remove the poisoned catalyzer and replace the same by a new one while the poisoned catalyzer is laid aside for regeneration.

Among the numerous disadvantages incident to this method of producing catalytic chemical reactions as new employed in the art, the following may be mentioned:

The support of inactive material which is impregnated with the catalytic agent occupies considerable space in the reaction chamber and owing to the impregnation of the catalytic agent in the material of the support, it is quite difficult to regenerate the agent or renew its catalytic powers. Moreover, the formation of the support itself into suitable form is a more or less difficult and laborious operation.

Secondly, in order to produce the desired reaction whereby a maximum yield of the end product may be obtained, it is essential that all of the reacting gases shall come into contact with the catalytic agent. Owing to the porous or permeable nature of the support a larger quantity of the gases passing through the reaction chamber will come into contact with certain parts of the surfaces of the support than with other parts thereof. This causes the catalytic agent on spaced parts of the support to become rapidly poisoned while that remaining on the other parts of the support is affected to a relatively negligible degree. In other words, there occurs a non-uniform activation of the catalytic agent on the support and it becomes necessary to regenerate the entire catalyzer before all of the catalytic properties have been exhausted. Further, owing to the use of such a fixed catalyzer there is progressively produced in the reaction chamber an increasing amount of the poisoned catalytic agent, the presence of which is highly disadvantageous for reasons generally recognized by those familiar with the art, such for instance as the production of undesirable by-products.

Predicated upon a constant temperature, pressure and condition of the catalyzer, there is a certain rate of flow of the reacting gases which will produce a maximum yield of the desired end product. However, with a fixed catalyzer, as the condition of the catalytic agent is constantly changing and its activity progressively decreases, it is obvious that in order to obtain such a maximum yield of the end product, frequent analysis must be made and changes in the temperature, pressure or rate of flow of the gases through the reaction chamber made to compensate for the decreased activity of the catalytic agent.

The replacing of the poisoned catalyzer with the new or regenerated catalyzer, particularly when the reaction chamber is at high temperature and under a high pressure materially increases the operating cost incident to the consumption of time and labor.

It has also been found that due to the variable activation of the fixed catalyzer and the changes in the rate of flow of the gases, temperature, or pressure in the reaction chamber, which are resultant thereon, that the serious danger exists, particularly in organic chemistry, of the formation of undesirable side reactions or by-products.

The several deficiencies of the prior art method as above referred to I have succeeded in entirely eliminating by means of my present method which I shall now proceed to describe in connection with the accompanying drawings disclosing several desirable types of apparatus whereby the method is successfully carried out in practice.

In Figure 1 of the drawings, the catalytic agent in powdered or finely comminuted form is periodically supplied from a hopper or reservoir 5 to the feeding chamber 6 by opening the valve 7. The bottom wall of the chamber 6 is formed with a plurality of collecting funnels 8 open at their apexes and through which the powdered catalyzer falls in a plurality of small streams into the reaction chamber 9. The gases or vapors enter this chamber at its lower end through the connection 10 and leave said chamber through the outlet connection 11. The catalyzer after falling through the reaction chamber 9 is collected in the chamber 12 which is connected to the lower end of the reaction chamber. The activated catalytic agent may be periodically removed from the chamber 12 by closing the valve 13 controlling communication between the collecting and reaction chambers and removing the cap or closure 14 on the outlet of the lower end of the chamber 12. If desired the catalytic agent may be regenerated and again introduced into the hopper or reservoir 5 by opening the closure 15 at the upper end of said reservoir. It will be evident that the temperature with the chambers 5, 6 and 12 is appreciably less than the temperature in the reaction chamber 9.

In operation, the gases or vapors are continuously circulated through the reaction chamber from the inlet 10 to the outlet 11 and during such circulation there is a continuous showering of the powdered catalytic agent from the feeding chamber 6 through the reaction chamber. By feeding the catalyzer into said chamber in a multiplicity of small streams, it is uniformly distributed throughout the area of the chamber so that there will be a uniform action of the comminuted particles of the catalytic agent and the desired reaction will take place with every particle of the gas or vapor passing through said chamber. As the used or poisoned catalytic material is being constantly replaced by fresh material, the catalytic reaction occurring in the chamber 9 will be of constant unvarying intensity with a predetermined temperature, pressure and rate of flow of the gases or vapors through the reaction chamber. As there is no collection of the used or poisoned catalytic agent within the reaction chamber, the vapors or gases will constantly encounter a catalytic agent the powers of which are unimpaired. As this agent is uniformly distributed throughout the area of the reaction chamber, the catalytic reaction will likewise be maintained at a constant uniformity with a predetermined temperature pressure and rate of flow of the gases or vapors.

The used catalytic agent collecting in the chamber 12 is periodically removed therefrom by removing the cap 14 and closing the valve 13. If desired this poisoned catalyzer may be regenerated and again placed within the hopper or reservoir 5.

By means of my improved method as above described, it will be apparent that the catalytic reaction is greatly accelerated by the continuous supply of unactivated catalytic material to the reaction chamber and the yield of the desired end product is greatly increased. By dispensing with the use of fixed catalyzer support in the reaction chamber, frequent variation in the temperature and pressure of the gases or vapors entering said chamber becomes unnecessary. The quantity of the catalytic agent supplied to the reaction chamber is determined in accordance with the temperature and rate of flow of the gases through said chamber, and no further attention, other than replenishing the supply of the catalytic agent is required. I have above described an embodiment of the apparatus wherein the finely ground catalytic agent is showered through the reaction chamber. However, the same result may be obtained by finely pulverizing the catalytic agent to such an extent that the specific gravity of the individual particles is so far reduced that they will be carried in suspension with the gases or vapors as the latter pass through the apparatus. This embodiment of my invention I have illustrated in Figure 2.

In the construction shown in Figure 2 the finely pulverized catalytic agent, preferably in colloidal suspension in a suitable fluid is supplied to the chamber 16 by means of the inlets 17. This chamber at its lower end is provided with an inlet 18 for the gases or vapors which flow upwardly through the chamber 18 and into the reaction chamber 19 which is horizontally disposed and in communication with the upper end of the chamber 16. The reaction chamber is provided at one end with an outlet 20.

A collecting chamber 21 for the heavier particles of the catalytic agent is connected to the lower end of the chamber 16, communication between said chambers being controlled by the valve 22 and the lower end of the chamber 21 having the removable closure 23.

In the operation of this form of apparatus, the gases or vapors entering the chamber 16 at its lower end catch up and carry in suspension the finely pulverized catalytic agent supplied to said chamber by the inlets 17. In the passage of the gases and the catalyzer through the chamber 19, the desired reaction occurs. Any desired means may be provided for effecting a separation of the catalytic agent from the gases or vapors, as by precipitation or filtering in the subsequent treatment for obtaining the desired end product. Such particles of the catalytic agent as are of greater specific gravity so that they are precipitated through the chamber 16 will be collected in the chamber 21 from which they may be periodically removed and regenerated. While I have referred to the use of injectors for supplying the finely divided catalytic agent it will be understood that any desired equivalent means might be employed for this purpose and that the apparatus likewise may be of various other forms than as herein illustrated. In fact, it is to be understood that the accompanying illustrations of apparatus are merely for the purpose of enabling the improved method of producing catalytic reactions to be more readily understood and that this method might be carried out in practice by means of innumerable types of such apparatus as would readily suggest themselves to one skilled in the art.

It will be seen that the present invention completely overcomes the several serious deficiencies incident to the use of such methods as have heretofore been employed and to which I have above referred. As the present method enables the catalytic reaction to be continuously carried on with perfect invariability or uniformity of the catalytic power, a constant ratio between the volume and rate of flow of the reacting gases or vapors and the supply of the catalytic agent may be maintained. Therefore, a constant reaction of known catalytic power, which is of primary importance in many cases, may be assured. Owing to such assurance, quantity production of the desired end product during a definite period of operation may be accurately determined.

I have herein referred to several desired ways in which my improved method may be successfully practiced, but it is nevertheless to be understood that the invention is susceptible of various modifications without material variation in the final result. I accordingly reserve the privilege of adopting all such legitimate changes as may be fairly embodied within the spirit and scope of the invention as claimed.

I claim:

1. The method of effecting catalytic reaction to minimize the production of side reactions comprising continuously bringing a reacting-fluid in contact with fresh quantities of a catalytic agent continuously and uniformly distributed in the reaction zone and continuously withdrawing substantially all of the used catalyst from the reaction zone immediately, after once falling through the gases whereby side reactions are avoided and a maximum yield of the end product is obtained.

2. The method of effecting catalytic reaction to minimize the production of side reactions comprising continuously bringing a reacting-fluid in contact with fresh quantities of a finely divided catalytic agent continuously and uniformly distributed in a series of fine streams in the reaction zone and continuously withdrawing substantially all of the used catalyst from the reaction zone immediately, after once falling through the gases whereby side reactions are avoided and a maximum yield of the end product is obtained.

In testimony that I claim the foregoing as my invention, I have signed my named hereunder.

HANS E. HAGGENMACHER.